US012621809B2

(12) United States Patent
Bin Sediq et al.

(10) Patent No.: US 12,621,809 B2
(45) Date of Patent: May 5, 2026

(54) DYNAMIC MACHINE LEARNING DECISION THRESHOLD FOR RESOURCE ALLOCATION

(71) Applicant: Telefonaktiebolaget LM Ericsson (publ), Stockholm (SE)

(72) Inventors: Akram Bin Sediq, Kanata (CA);
Peiliang Chang, Åkersberga (SE);
Mats Zachrison, Örebro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 496 days.

(21) Appl. No.: 17/802,355

(22) PCT Filed: Mar. 12, 2020

(86) PCT No.: PCT/IB2020/052244
§ 371 (c)(1),
(2) Date: Aug. 25, 2022

(87) PCT Pub. No.: WO2021/181137
PCT Pub. Date: Sep. 16, 2021

(65) Prior Publication Data
US 2023/0088733 A1     Mar. 23, 2023

(51) Int. Cl.
*H04W 72/04*      (2023.01)
*H04L 5/00*       (2006.01)

(52) U.S. Cl.
CPC .......... *H04W 72/04* (2013.01); *H04L 5/0048* (2013.01)

(58) Field of Classification Search
CPC .... H04L 5/0048; H04W 72/21; H04W 72/04; H04W 72/52; H04W 72/543
See application file for complete search history.

(56) References Cited

U.S. PATENT DOCUMENTS 5,886,988 A * 3/1999 Yun ...................... H04B 7/0491
                                                    370/329
5,903,843 A * 5/1999 Suzuki .................. H04W 16/06
                                                    455/452.2

(Continued)

FOREIGN PATENT DOCUMENTS

AU     2006252481 A1 * 12/2006   ............. H04W 72/23
AU     2008216213 A1 *  8/2008   ............. H04W 52/10

(Continued)

OTHER PUBLICATIONS

International Search Report and Written Opinion dated Nov. 9, 2020 issued in PCT Application No. PCT/IB2020/052244, consisting of 14 pages.

(Continued)

*Primary Examiner* — Mehmood B. Khan

(74) *Attorney, Agent, or Firm* — Sonoda & Kobayashi Intellectual Property Law; Sarvajit S. Patil

(57) ABSTRACT

Methods and apparatuses are provided for dynamic machine learning decision threshold for resource allocation/de-allocation. In one embodiment, a network node includes processing circuitry configured to cause the network node to dynamically adjust an allocation decision threshold; and determine whether to allocate at least one radio resource based at least in part on the allocation decision threshold. In one embodiment, a network node includes processing circuitry configured to cause the network node to dynamically adjust a de-allocation decision threshold; and determine whether to de-allocate at least one radio resource based at least in part on the de-allocation decision threshold.

27 Claims, 5 Drawing Sheets

(56) References Cited

U.S. PATENT DOCUMENTS

| | | | | |
|---|---|---|---|---|
| 6,016,305 | A * | 1/2000 | Borst | H04L 12/5602 370/337 |
| 6,075,777 | A * | 6/2000 | Agrawal | H04W 16/10 370/437 |
| 6,469,993 | B1 * | 10/2002 | Seo | H04W 72/566 455/452.2 |
| 7,616,711 | B2 * | 11/2009 | Gore | H04L 25/0226 375/350 |
| 8,107,425 | B2 * | 1/2012 | de Bruin | H04L 1/0006 370/252 |
| 9,380,576 | B2 * | 6/2016 | Li | H04W 72/044 |
| 10,701,702 | B2 * | 6/2020 | Shih | H04W 76/11 |
| 2004/0037286 | A1 * | 2/2004 | Huang | H04W 72/12 370/412 |
| 2004/0116143 | A1 * | 6/2004 | Love | H04L 1/20 455/522 |
| 2004/0120258 | A1 * | 6/2004 | Mattila | H04L 47/6255 370/239 |
| 2006/0002397 | A1 * | 1/2006 | Xue | H04L 69/16 370/395.2 |
| 2006/0019662 | A1 * | 1/2006 | Andrews | H04W 72/566 455/435.3 |
| 2006/0062171 | A1 * | 3/2006 | Baiamonte | H04L 47/2416 370/328 |
| 2006/0285522 | A1 * | 12/2006 | Kim | H04W 72/542 370/331 |
| 2007/0248042 | A1 * | 10/2007 | Harikumar | H04W 72/542 370/329 |
| 2008/0233967 | A1 * | 9/2008 | Montojo | H04W 72/541 455/452.2 |
| 2009/0092091 | A1 * | 4/2009 | Balasubramanian | H04L 5/0087 370/329 |
| 2015/0373582 | A1 * | 12/2015 | Valliappan | H04W 72/52 370/329 |
| 2016/0037547 | A1 * | 2/2016 | Yang | H04L 1/1812 370/329 |
| 2017/0126792 | A1 * | 5/2017 | Halpern | H04L 43/0894 |
| 2017/0208483 | A1 * | 7/2017 | Chmiel | H04L 5/001 |
| 2017/0325229 | A1 * | 11/2017 | Gao | H04W 72/52 |
| 2018/0027554 | A1 * | 1/2018 | Yerramalli | H04L 5/0055 370/329 |
| 2018/0097597 | A1 | 4/2018 | Legg et al. | |
| 2018/0109605 | A1 | 4/2018 | Stephens | |
| 2018/0309561 | A1 * | 10/2018 | Nozawa | H04W 72/04 |
| 2019/0021101 | A1 * | 1/2019 | Wang | H04W 72/1268 |
| 2019/0059019 | A1 * | 2/2019 | Wallentin | H04W 28/0278 |
| 2019/0075586 | A1 | 3/2019 | Xu et al. | |
| 2020/0045724 | A1 * | 2/2020 | Lu | H04W 72/121 |
| 2020/0067738 | A1 * | 2/2020 | Ren | H04L 5/0048 |
| 2020/0344799 | A1 * | 10/2020 | Sundman | H04W 74/006 |
| 2021/0045093 | A1 * | 2/2021 | Rao | H04W 76/14 |
| 2021/0051508 | A1 * | 2/2021 | Chung | H04L 5/0048 |
| 2021/0410155 | A1 * | 12/2021 | Khoshnevisan | H04L 1/1896 |
| 2022/0303826 | A1 * | 9/2022 | Zhao | H04W 72/21 |

FOREIGN PATENT DOCUMENTS

| | | | | | |
|---|---|---|---|---|---|
| CN | 101233770 | A * | 7/2008 | | |
| EP | 1139605 | A1 * | 10/2001 | | H04W 72/52 |
| EP | 3338499 | A1 | 6/2018 | | |
| WO | WO-2005002157 | A1 * | 1/2005 | | H04L 1/0006 |
| WO | WO-2006130741 | A1 * | 12/2006 | | H04W 72/23 |
| WO | WO-2017029539 | A1 * | 2/2017 | | H04W 72/21 |
| WO | WO-2018203201 | A1 * | 11/2018 | | H04L 5/0048 |
| WO | WO-2019125247 | A1 * | 6/2019 | | H04W 72/52 |

OTHER PUBLICATIONS

Delgado et al., Fast Convergence Outer Loop Link Adaptation With Infrequent Updates in Steady State, 2017 IEEE 86th Vehicular Technology Conference (VTC-Fall), Toronto, ON, 2017, consisting of 5 pages.

Pedersen et al., Frequency Domain Scheduling for OFDMA With Limited and Noisy Channel Feedback, 2007 IEEE 66th Vehicular Technology Conference, Baltimore, MD, 2007, consisting of 5 pages.

Sampath et al., On Setting Reverse Link Target SIR in a CDMA System, 1997 IEEE 47th Vehicular Technology Conference, Technology in Motion, Phoenix, AZ, 1997, consisting of 5 pages.

* cited by examiner

Network Node _16_

SW _40_

HW _27_

Communication interface _28_

Radio interface _30_

Processing circuitry _34_

Memory _38_

Processor _36_

Allocation Unit  _24_

De-allocation Unit _26_

WD _22_

SW _52_

Client application _54_

HW _42_

Radio interface _44_

Processing circuitry _46_

Memory _50_

Processor _48_

_32_

BEGIN

Dynamically adjust a de-allocation decision threshold
S110

Determine whether to de-allocate at least one radio
resource based at least in part on the de-allocation decision
threshold
S112

END

DYNAMIC MACHINE LEARNING DECISION THRESHOLD FOR RESOURCE ALLOCATION

CROSS-REFERENCE TO RELATED APPLICATION

This application is a Submission Under 35 U.S.C. § 371 for U.S. National Stage Patent Application of International Application Number: PCT/IB2020/052244, filed Mar. 12, 2020 entitled "DYNAMIC MACHINE LEARNING DECISION THRESHOLD FOR RESOURCE ALLOCATION," the entirety of which is incorporated herein by reference.

TECHNICAL FIELD

The present disclosure relates wireless communications and, in particular, to dynamic machine learning decision threshold for resource allocation/de-allocation.

BACKGROUND

In a wireless network, there is a general problem of assigning a limited number of radio resources in a given system to user devices (e.g., wireless devices and/or user equipments). Techniques for more efficiently allocating such radio resources to user devices are being considered.

SUMMARY

Some embodiments of the present disclosure advantageously provide methods, apparatuses and systems related to using one or more dynamic machine learning decision thresholds for resource allocation/de-allocation.

According to one aspect of the present disclosure, a method implemented in a network node is provided. The method includes dynamically adjusting an allocation decision threshold; and determining whether to allocate at least one radio resource based at least in part on the allocation decision threshold.

In some embodiments of this aspect, determining whether to allocate the at least one radio resource further includes determining whether to allocate the at least one radio resource for a sounding reference signal, SRS, based at least in part on the allocation decision threshold. In some embodiments of this aspect, dynamically adjusting the allocation decision threshold includes dynamically adjusting the allocation decision threshold to achieve a target allocation. In some embodiments of this aspect, the target allocation comprises a target probability that an event will occur. In some embodiments of this aspect, the target allocation is based at least in part on at least one of: a target allocation error; a cost associated with allocating the at least one radio resource; and a number of radio resource control, RRC, reconfigurations associated with allocating the at least one radio resource.

In some embodiments of this aspect, the target probability is a predetermined target probability that the event will occur. In some embodiments of this aspect, the event is one of: that a radio resource is unavailable for allocation to a wireless device; and that the radio resource is unavailable for allocation to the wireless device while an estimated benefit to the wireless device is greater than or equal to the allocation decision threshold. In some embodiments of this aspect, dynamically adjusting the allocation decision threshold includes determining whether there is at least one radio resource that is available for the allocation to a wireless device; increasing the allocation decision threshold by at least one step up parameter when there is at least one radio resource that is available for the allocation to the wireless device; and decreasing the allocation decision threshold by at least one step down parameter when there is an unavailability of at least one radio resource for the allocation to the wireless device.

In some embodiments of this aspect, dynamically adjusting the allocation decision threshold includes determining whether there is at least one radio resource that is available for the allocation to a wireless device; increasing the allocation decision threshold by at least one step up parameter when there is at least one radio resource that is available for the allocation to the wireless device and an estimated benefit to the wireless device is greater than or equal to the allocation decision threshold; and decreasing the allocation decision threshold by at least one step down parameter when there is an unavailability of at least one radio resource for the allocation to the wireless device.

In some embodiments of this aspect, a size of at least one of the step up parameter and the step down parameter is based at least in part on a target allocation. In some embodiments of this aspect, determining whether to allocate the at least one radio resource based at least in part on the allocation decision threshold includes estimating a benefit of allocating the at least one radio resource to the wireless device; comparing the estimated benefit to the allocation decision threshold; and one of allocating and not allocating the at least one radio resource to the wireless device based at least in part on the comparison of the estimated benefit to the allocation decision threshold. In some embodiments of this aspect, estimating the benefit of allocating the at least one radio resource to the wireless device further includes estimating the benefit to the wireless device based at least in part on at least one of: a total of data transmitted in a downlink channel to the wireless device; a total of time that the wireless device has been active in a system of the network node; a downlink inactivity time; and using a machine learning algorithm.

In some embodiments of this aspect, the method further includes one of allocating and not allocating the at least one radio resource to the wireless device based on the determination. In some embodiments of this aspect, determining whether to allocate the at least one radio resource based at least in part on the allocation decision threshold includes using the dynamically adjusted allocation decision threshold to control an output of a binary classification system, the binary classification system configured to determine whether to allocate the at least one radio resource to the wireless device.

According to another aspect of the present disclosure, a method implemented in a network node is provided. The method includes dynamically adjusting a de-allocation decision threshold; and determining whether to de-allocate at least one radio resource based at least in part on the de-allocation decision threshold.

In some embodiments of this aspect, determining whether to de-allocate the at least one radio resource further includes determining whether to de-allocate the at least one radio resource for a sounding reference signal, SRS, based at least in part on the allocation decision threshold. In some embodiments of this aspect, dynamically adjusting the de-allocation decision threshold includes dynamically adjusting the de-allocation decision threshold to achieve a target de-allocation. In some embodiments of this aspect, the target de-allocation includes a target probability that an event will occur.

In some embodiments of this aspect, the target de-allocation is based at least in part on at least one of: a target de-allocation error; a cost associated with de-allocating the at least one radio resource; and a number of radio resource control, RRC, reconfigurations associated with de-allocating the at least one radio resource. In some embodiments of this aspect, the target probability is a predetermined target probability associated with at least one of: a probability of de-allocating resources to a wireless device; and a probability of de-allocating resources to the wireless device and a same wireless device is subsequently allocated resources.

In some embodiments of this aspect, determining whether to de-allocate the at least one radio resource based at least in part on the de-allocation decision threshold includes estimating a non-benefit of de-allocating the at least one radio resource to the wireless device; comparing the estimated non-benefit to the de-allocation decision threshold; and one of de-allocating and not de-allocating the at least one radio resource to the wireless device based at least in part on the comparison of the estimated non-benefit to the de-allocation decision threshold.

In some embodiments of this aspect, dynamically adjusting the de-allocation decision threshold further includes increasing the de-allocation decision threshold by at least one step up parameter when the one of the de-allocating and not de-allocating is de-allocating; and decreasing the de-allocation decision threshold by at least one step down parameter when the one of the de-allocating and not de-allocating is not deallocating.

In some embodiments of this aspect, dynamically adjusting the de-allocation decision threshold further includes decreasing the de-allocation decision threshold by at least one step down parameter when the one of the de-allocating and not deallocating is de-allocating; and increasing the de-allocation decision threshold by at least one step up parameter and at least one step down parameter when the one of the de-allocating and not de-allocating is not de-allocating and is further a re-allocation. In some embodiments of this aspect, a size of at least one of the step up parameter and the step down parameter is based at least in part on a target de-allocation. In some embodiments of this aspect, estimating the non-benefit of de-allocating the at least one radio resource to the wireless device includes estimating the non-benefit to the wireless device based at least in part on at least one of: a total of data transmitted in a downlink channel to the wireless device; a total of time that the wireless device has been active in a system of the network node; a downlink inactivity time; and using a machine learning algorithm. In some embodiments of this aspect, the method further includes one of de-allocating and not de-allocating the at least one radio resource to the wireless device based on the determination. In some embodiments of this aspect, determining whether to de-allocate the at least one radio resource based at least in part on the de-allocation decision threshold includes using the dynamically adjusted de-allocation decision threshold to control an output of a binary classification system, the binary classification system configured to determine whether to deallocate the at least one radio resource to the wireless device.

According to yet another aspect of the present disclosure, a network node is provided. The network node includes processing circuitry. The processing circuitry is configured to cause the network node to dynamically adjust an allocation decision threshold; and determine whether to allocate at least one radio resource based at least in part on the allocation decision threshold.

In some embodiments of this aspect, the processing circuitry is configured to determine whether to allocate the at least one radio resource by being configured to determine whether to allocate the at least one radio resource for a sounding reference signal, SRS, based at least in part on the allocation decision threshold. In some embodiments of this aspect, the processing circuitry is configured to dynamically adjust the allocation decision threshold by being configured to dynamically adjust the allocation decision threshold to achieve a target allocation. In some embodiments of this aspect, the target allocation comprises a target probability that an event will occur.

In some embodiments of this aspect, the target allocation is based at least in part on at least one of: a target allocation error; a cost associated with allocating the at least one radio resource; and a number of radio resource control, RRC, reconfigurations associated with allocating the at least one radio resource. In some embodiments of this aspect, the target probability is a predetermined target probability that the event will occur. In some embodiments of this aspect, the event is one of: that a radio resource is unavailable for allocation to a wireless device; and that the radio resource is unavailable for allocation to the wireless device while an estimated benefit to the wireless device is greater than or equal to the allocation decision threshold.

In some embodiments of this aspect, the processing circuitry is configured to dynamically adjust the allocation decision threshold by being configured to determine whether there is at least one radio resource that is available for the allocation to a wireless device; increase the allocation decision threshold by at least one step up parameter when there is at least one radio resource that is available for the allocation to the wireless device; and decrease the allocation decision threshold by at least one step down parameter when there is an unavailability of at least one radio resource for the allocation to the wireless device.

In some embodiments of this aspect, the processing circuitry is configured to dynamically adjust the allocation decision threshold by being configured to determine whether there is at least one radio resource that is available for the allocation to a wireless device; increase the allocation decision threshold by at least one step up parameter when there is at least one radio resource that is available for the allocation to the wireless device and an estimated benefit to the wireless device is greater than or equal to the allocation decision threshold; and decrease the allocation decision threshold by at least one step down parameter when there is an unavailability of at least one radio resource for the allocation to the wireless device.

In some embodiments of this aspect, a size of at least one of the step up parameter and the step down parameter is based at least in part on a target allocation. In some embodiments of this aspect, the processing circuitry is configured to determine whether to allocate the at least one radio resource based at least in part on the allocation decision threshold by being configured to: estimate a benefit of allocating the at least one radio resource to the wireless device; compare the estimated benefit to the allocation decision threshold; and one of allocate and not allocate the at least one radio resource to the wireless device based at least in part on the comparison of the estimated benefit to the allocation decision threshold. In some embodiments of this aspect, the processing circuitry is configured to estimate the benefit of allocating the at least one radio resource to the wireless device by being configured to: estimate the benefit to the wireless device based at least in part on at least one of: a total of data transmitted in a downlink channel to the wireless device; a total of time that the wireless device has been active in a system of the network node; a downlink inactivity time; and using a machine learning algorithm. In some embodiments of this aspect, the processing circuitry is further configured to one of allocate and not allocate the at least one radio resource to the wireless device based on the determination.

In some embodiments of this aspect, the processing circuitry is configured to determine whether to allocate the at least one radio resource based at least in part on the allocation decision threshold by being configured to use the dynamically adjusted allocation decision threshold to control an output of a binary classification system, the binary classification system configured to determine whether to allocate the at least one radio resource to the wireless device.

According to another aspect of the present disclosure, a network node is provided. The network node includes processing circuitry. The processing circuitry is configured to cause the network node to dynamically adjust a de-allocation decision threshold; and determine whether to de-allocate at least one radio resource based at least in part on the de-allocation decision threshold.

In some embodiments of this aspect, the processing circuitry is configured to determine whether to de-allocate the at least one radio resource by being configured to determine whether to de-allocate the at least one radio resource for a sounding reference signal, SRS, based at least in part on the allocation decision threshold. In some embodiments of this aspect, the processing circuitry is configured to dynamically adjust the de-allocation decision threshold by being configured to dynamically adjust the de-allocation decision threshold to achieve a target de-allocation. In some embodiments of this aspect, the target de-allocation includes a target probability that an event will occur.

In some embodiments of this aspect, the target de-allocation is based at least in part on at least one of: a target de-allocation error; a cost associated with de-allocating the at least one radio resource; and a number of radio resource control, RRC, reconfigurations associated with de-allocating the at least one radio resource. In some embodiments of this aspect, the target probability is a predetermined target probability associated with at least one of: a probability of de-allocating resources to a wireless device; and a probability of de-allocating resources to the wireless device and a same wireless device is subsequently allocated resources.

In some embodiments of this aspect, the processing circuitry is configured to determine whether to de-allocate the at least one radio resource based at least in part on the de-allocation decision threshold by being configured to estimate a non-benefit of de-allocating the at least one radio resource to the wireless device; compare the estimated non-benefit to the de-allocation decision threshold; and one of de-allocate and not de-allocate the at least one radio resource to the wireless device based at least in part on the comparison of the estimated non-benefit to the de-allocation decision threshold. In some embodiments of this aspect, the processing circuitry is configured to dynamically adjust the de-allocation decision threshold by being configured to increase the de-allocation decision threshold by at least one step up parameter when the one of the de-allocating and not de-allocating is de-allocating; and decrease the de-allocation decision threshold by at least one step down parameter when the one of the de-allocating and not de-allocating is not de-allocating.

In some embodiments of this aspect, the processing circuitry is configured to dynamically adjust the de-allocation decision threshold by being configured to decrease the de-allocation decision threshold by at least one step down parameter when the one of the de-allocating and not de-allocating is de-allocating; and increase the de-allocation decision threshold by at least one step up parameter and at least one step down parameter when the one of the de-allocating and not de-allocating is not deallocating and is further a re-allocation. In some embodiments of this aspect, a size of at least one of the step up parameter and the step down parameter is based at least in part on a target de-allocation.

In some embodiments of this aspect, the processing circuitry is configured to estimate the non-benefit of de-allocating the at least one radio resource to the wireless device by being configured to estimate the non-benefit to the wireless device based at least in part on at least one of: a total of data transmitted in a downlink channel to the wireless device; a total of time that the wireless device has been active in a system of the network node; a downlink inactivity time; and using a machine learning algorithm. In some embodiments of this aspect, the processing circuitry is further configured to one of de-allocate and not de-allocate the at least one radio resource to the wireless device based on the determination. In some embodiments of this aspect, the processing circuitry is configured to determine whether to de-allocate the at least one radio resource based at least in part on the de-allocation decision threshold by being configured to use the dynamically adjusted de-allocation decision threshold to control an output of a binary classification system, the binary classification system configured to determine whether to de-allocate the at least one radio resource to the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
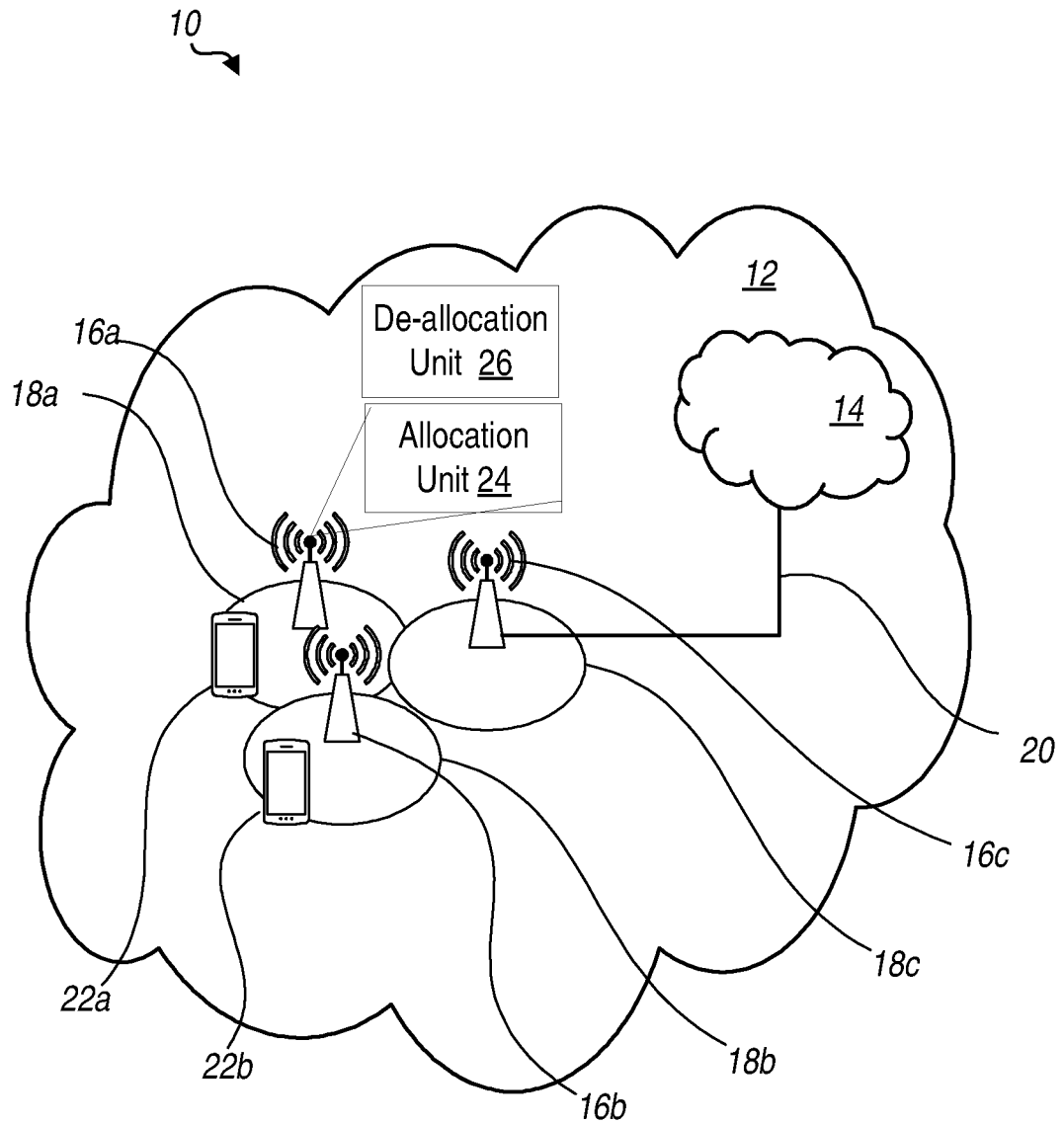
FIG. 1 is a schematic diagram of an example network architecture illustrating a communication system according to the principles in the present disclosure.

As discussed above, there is a general problem of assigning a limited number of radio resources in a system to user devices (e.g., wireless devices and/or user equipments). Such problems may generally be associated with one or more of the following:

user devices arrive at an unknown arrival rate to the system;

a user device may receive a benefit from having a resource allocated to such user;

a user device may be allocated at most one resource e.g., for a particular signal;

a user device may be allocated and/or de-allocated the resource by the system at any time the user device is active (though, there is a cost for allocating and deallocating resources);

a user device enters the system, and stays active for a period of time, that is unknown to the system (after this period, the user device exits the system and returns the resource that the user device was allocated if any); and a system may be considered to receive a benefit (>=0) by allocating a resource to a user device. The benefit may be governed by one or more of the following attributes:

For a given user device, the benefit may be the same regardless of the resource that was chosen to be allocated to the user device. In other words, all resources are equal from the user device point of view.

For a given resource, the benefit of allocating the resource to user device i can be different from allocating the resource to user device j.

The exact benefit of a resource to a user device may not be readily available to the system. However, the system may have access to an estimator that outputs a quantity, p(user), which predicts the likely benefit of the user device if the user device is allocated a resource. The estimator may strive to output higher values when higher benefits are likely, but the estimator is not guaranteed to achieve that all the time. In other words, the estimator may have an inherent inaccuracy in estimating the benefit.

The benefit of a resource to a user device is a non-decreasing function of the time the user device is assigned the resource. The benefit is by definition 0 when the user device is not assigned a resource for the entire active period.

The system benefit may be considered a total of benefits received by the system's user devices.

One goal of the system may be to allocate its limited resources to maximize its long-term average benefits, which may be defined as the sum of all benefits received by the user devices divided by a time window (T), as T goes to infinity. One application of the problem described above is the allocation of limited periodic sounding reference signals (SRS) resources in Third Generation Partnership Project Long Term Evolution (LTE) and/or 3GPP New Radio (NR), also called 5G networks. For example, each allocation or de-allocation of periodic SRS resources involves radio resource control (RRC) configuration/reconfiguration signaling, which the network may attempt to minimize. Each user device having been allocated an SRS resource transmits a sounding reference signal as specified by the RRC messages. Transmission of SRS allows the network to obtain more accurate knowledge of the physical uplink channel. If downlink-uplink reciprocity holds, e.g., as in time-division-duplexing (TDD) scenarios, the network can also use the SRS to estimate the physical downlink channel. Such accurate estimation of the channel allows the network to serve user devices better, as compared to existing networks without SRS, by designing better beamforming and improving link adaptations and power control, which can lead to higher throughputs for such user devices. Since there are limited number of periodic SRS resources, the network may strive to allocate such resources to user devices who will likely benefit the most from SRS resources. For example, the network may be designed and/or configured with a policy that strives to allocate SRS resources to user devices (e.g., wireless devices and/or user equipments) that download the largest amount of data. The network may have an observation window in time, to observe the user device traffic, and then to decide whether the user device is likely to be a 'heavy user,' which may indicate the user device is likely to receive a higher benefit from being allocated an SRS resource (as compared to a 'light user', which may be e.g., a user device that does not download large amounts of data). Alternatively, the network may asynchronously react to an event at any time to determine whether the user device is likely to be associated with a heavy user.

Yet another application of the problem described above is when the computational power in the network is limited, such that advanced algorithms cannot be executed for every user device. In such application, the network may strive to apply advanced algorithms only to the top user devices who will receive a largest benefit from such algorithms, as compared to other user devices.

A trivial way to assign the limited resources, e.g., in the above applications is to assign resources in a first-come-first-serve approach. This approach may work well if the number of active user devices in the system is less or equal to the number of resources. In the general case, however, this approach can be quite inefficient.

Better approaches to assign the limited resources have been considered. For example, a machine learning classifying algorithm may be considered to classify the user devices to 'heavy' or 'light' based on a predicted data volume and/or data throughput. In particular, an observation window may be specified during which traffic characteristics may be observed. At the end of the observation window, a machine learning algorithm may use the traffic characteristics to derive input features which may then be fed as inputs into a classification algorithm that predicts whether a user device is 'heavy' or 'light' user device. The user device may be assigned one of the limited resources if and only if such user device is predicted to be a heavy user device.

However, such approaches do not take into consideration the long-term load of a system in allocating the limited resources to users, which reduces the efficacy of such solutions.

Some embodiments of the present disclosure provide for dynamic thresholds that are used in deciding/determining whether the user device should be allocated and/or deallocated a resource. In particular, in some embodiments, one or more of at least two decision thresholds, called herein as, allocTh and dellaocTh, may be used, such that:

a user device without a resource will be allocated a resource if the user's estimated or predicted benefit at least meets (e.g., is greater-than or equal-to) an allocation threshold (allocTh); and/or a user device with a resource will be de-allocated the resource if the user's estimated or predicted non-benefit at least meets (e.g., is greater-than or equal-to) a de-allocation threshold (deallocTh).

In some embodiments, one or more of the two thresholds are updated dynamically in order to achieve a predefined target probability of a particular event, which is explained in more detail herein below.

Some embodiments may advantageously achieve higher long-term benefits compared to existing schemes that do not adapt the decision criteria for allocating and deallocating resources. The techniques provided in this disclosure may be applied in the problem of allocating periodic SRS resources and achieve better throughput by allocating SRS resources to user devices with a predicted higher data volume. Alternatively, or additionally, the techniques provided in this disclosure may be applied to other resource allocation problems, as well, such as other signals, other types of reference signals, other channels and yet other types of resources that can be allocated by a network/system for a user.

Before describing in detail exemplary embodiments, it is noted that the embodiments reside primarily in combinations of apparatus components and processing steps related to dynamic machine learning decision threshold for resource allocation. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "adjusting" may be considered to indicate increasing or decreasing. In some embodiments, the term "dynamically adjusting" may be considered to indicate continuously adjusting as in, for example, an outer loop of an allocation control loop.

In some embodiments, the term "allocation" may be considered to refer to a WD being allocated one or more resources for a transmission, such as, for example, allocating a radio resource on a channel for a signal to be transmitted to or from the WD (e.g., time-frequency resource for SRS on a physical uplink channel). In some embodiments, a network node may allocate resources by scheduling a WD and, for example, configuring the WD with the allocated resources via e.g., radio resource control (RRC) signaling in a higher layer and/or by signaling an indication of the allocated resources in MAC layer via, e.g., a MAC control element, and/or a physical layer via e.g., a grant in downlink control information (DCI).

In some embodiments, the term "radio resource" is intended to indicate a frequency resource, a time resource, code resource, and/or spatial resource. The time resource may correspond to any type of physical resource or radio resource expressed in terms of length of time. Examples of time resources are: symbol, time slot, subframe, radio frame, transmission time interval (TTI), interleaving time, etc. The frequency resource may correspond to one or more resource elements, subcarriers, resource blocks, bandwidth part and/or any other resources in the frequency domain. The radio resource may also indicate a combination of subcarriers, time slots, codes and/or spatial dimensions.

Even though the descriptions herein may be explained in the context of one of a Downlink (DL) and an Uplink (UL) communication, it should be understood that the basic principles disclosed may also be applicable to the other of the one of the DL and the UL communication. For DL communication, the network node is the transmitter and the receiver is the WD. For the UL communication, the transmitter is the WD and the receiver is the network node.

Although some of the examples herein may be explained in the context of a WD being allocated radio resources on a physical channel for a periodic reference signal (e.g., SRS), it should be understood that the principles may also be applicable to other signals and other types of resources or other channels.

In some embodiments, the allocated radio resource may be allocated for a particular signal and on a particular channel. Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data. In some embodiments, the channel described herein may be an uplink channel and in further embodiments may be a physical uplink shared channel (PUSCH) or a physical uplink control channel (PUCCH). In some embodiments, the channel may be a downlink channel, such as, a physical downlink control channel (PDCCH) or a physical downlink shared channel (PDSCH).

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for using one or more dynamic machine learning decision thresholds for resource allocation/de-allocation.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include an allocation unit 24 which is configured to cause the network node to dynamically adjust an allocation decision threshold; and determine whether to allocate at least one radio resource based at least in part on the allocation decision threshold. In some embodiments, a network node 16 is configured to include a de-allocation unit 26 which is configured to cause the network node to dynamically adjust a de-allocation decision threshold; and determine whether to de-allocate at least one radio resource based at least in part on the de-allocation decision threshold.

Example implementations, in accordance with an embodiment, of the WD 22 and network node 16 discussed in the preceding paragraphs will now be described with reference to FIG. 2.

The communication system 10 further includes a network node 16 provided in a communication system 10 and including hardware 27 enabling it to communicate with the WD 22. The hardware 27 may include a communication interface 28 for setting up and maintaining a wired or wireless connection with an interface of a different communication device of the communication system 10, as well as a radio interface 30 for setting up and maintaining at least a wireless connection 32 with a WD 22 located in a coverage area 18 served by the network node 16. The radio interface 30 may be formed as or may include, for example, one or more RF transmitters, one or more RF receivers, and/or one or more RF transceivers.

In the embodiment shown, the hardware 27 of the network node 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 40 stored internally in, for example, memory 38, or stored in external memory (e.g., database, storage array, network storage device, etc.) accessible by the network node 16 via an external connection. The software 40 may be executable by the processing circuitry 34. The processing circuitry 34 may be configured to control any of the methods and/or processes described herein and/or to cause such methods, and/or processes to be performed, e.g., by network node 16. Processor 36 corresponds to one or more processors 36 for performing network node 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to network node 16. For example, processing circuitry 34 of the network node 16 may include allocation unit 24 and/or de-allocation unit 26 configured to perform network node methods discussed herein, such as the methods discussed with reference to FIGS. 3 and 4 as well as other figures.

The communication system 10 further includes the WD 22 already referred to. The WD 22 may have hardware 42 that may include a radio interface 44 configured to set up and maintain a wireless connection 32 with a network node 16 serving a coverage area 18 in which the WD 22 is currently located. The radio interface 44 may be formed as or may include, for example, one or more RF transmitters, one or more RF receivers, and/or one or more RF transceivers.

The hardware 42 of the WD 22 further includes processing circuitry 46. The processing circuitry 46 may include a processor 48 and memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 52, which is stored in, for example, memory 50 at the WD 22, or stored in external memory (e.g., database, storage array, network storage device, etc.) accessible by the WD 22. The software 52 may be executable by the processing circuitry 46. The software 52 may include a client application 54. The client application 54 may be operable to provide a service to a human or non-human user via the WD 22. The client application 54 may interact with the user to generate the user data that it provides.

The processing circuitry 46 may be configured to control any of the methods and/or processes described herein and/or to cause such methods, and/or processes to be performed, e.g., by WD 22. The processor 48 corresponds to one or more processors 48 for performing WD 22 functions described herein. The WD 22 includes memory 50 that is configured to store data, programmatic software code and/or other information described herein. In some embodiments, the software 52 and/or the client application 54 may include instructions that, when executed by the processor 48 and/or processing circuitry 46, causes the processor 48 and/or processing circuitry 46 to perform the processes described herein with respect to WD 22. For example, the processing circuitry 46 of the wireless device 22 may be configured to use resources and/or receive and/or transmit on radio resources (e.g., physical layer resources, such as, physical downlink control channel, physical downlink shared channel, physical uplink control channel and/or physical uplink shared channel, etc.) that are allocated to the WD 22 using one or more of the techniques disclosed herein.

Figure 2:
FIG. 2 is a block diagram of a network node in communication with a wireless device over an at least partially wireless connection according to some embodiments of the present disclosure.

In some embodiments, the inner workings of the network node 16 and WD 22, may be as shown in FIG. 2 and independently, the surrounding network topology may be that of FIG. 1.

Although FIGS. 1 and 2 show various "units" such as allocation unit 24 and de-allocation unit 26 as being within a processor, it is contemplated that these units may be implemented such that a portion of the unit is stored in a corresponding memory within the processing circuitry. In other words, the units may be implemented in hardware or in a combination of hardware and software within the processing circuitry.

In addition, although FIGS. 1 and 2 show both allocation unit 24 and de-allocation unit 26 as being with the network node 16, it is contemplated that the network node 16 may include only one of these units.

Figure 3:
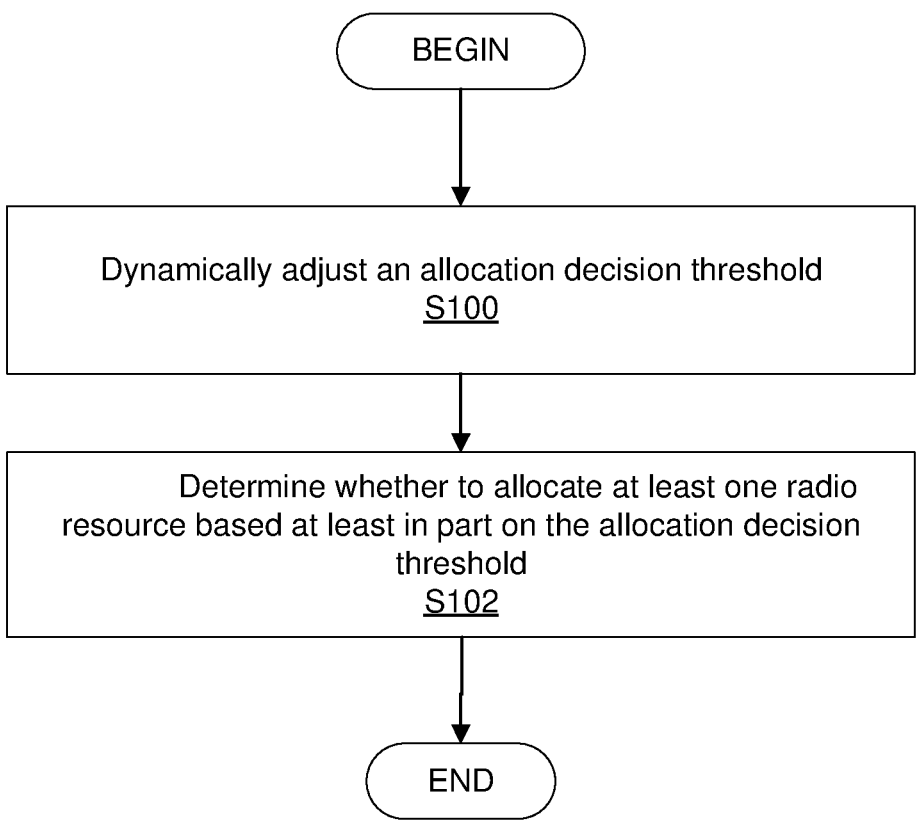
FIG. 3 is a flowchart of an example method for a network node for allocating resources according to one embodiment of the present disclosure.

FIG. 3 is a flowchart of an exemplary process in a network node 16 for allocating resources using a dynamic decision threshold according to some embodiments of the present disclosure. One or more Blocks and/or functions and/or methods performed by the network node 16 may be performed by one or more elements of network node 16 such as by allocation unit 24 in processing circuitry 34, processor 36, communication interface 28, radio interface 30, etc. according to the example method. The example method includes dynamically adjusting (Block S100), such as allocation unit 24, processing circuitry 34, processor 36, communication interface 28 and/or radio interface 30, an allocation decision threshold. The method includes determining (Block S102), such as allocation unit 24, processing circuitry 34, processor 36, communication interface 28 and/or radio interface 30, whether to allocate at least one radio resource based at least in part on the allocation decision threshold.

In some embodiments, determining whether to allocate the at least one radio resource further includes determining, such as via allocation unit 24, processing circuitry 34, processor 36, communication interface 28 and/or radio interface 30, whether to allocate the at least one radio resource for a sounding reference signal, SRS, based at least in part on the allocation decision threshold. In some embodiments, dynamically adjusting the allocation decision threshold includes dynamically adjusting, such as via allocation unit 24, processing circuitry 34, processor 36, communication interface 28 and/or radio interface 30, the allocation decision threshold to achieve a target allocation. In some embodiments, the target allocation comprises a target probability that an event will occur.

In some embodiments, the target allocation is based at least in part on at least one of: a target allocation error; a cost associated with allocating the at least one radio resource; and a number of radio resource control, RRC, reconfigurations associated with allocating the at least one radio resource. In some embodiments, the target probability is a predetermined target probability that the event will occur, the event being one of: that a radio resource is unavailable for allocation to a wireless device; and that the radio resource is unavailable for allocation to the wireless device while an estimated benefit to the wireless device is greater than or equal to the allocation decision threshold.

In some embodiments, dynamically adjusting the allocation decision threshold includes determining, such as via allocation unit 24, processing circuitry 34, processor 36, communication interface 28 and/or radio interface 30, whether there is at least one radio resource that is available for the allocation to a wireless device 22; increasing, such as via allocation unit 24, processing circuitry 34, processor 36, communication interface 28 and/or radio interface 30, the allocation decision threshold by at least one step up parameter when there is at least one radio resource that is available for the allocation to the wireless device 22; and decreasing, such as via allocation unit 24, processing circuitry 34, processor 36, communication interface 28 and/or radio inter-face 30, the allocation decision threshold by at least one step down parameter when there is an unavailability of at least one radio resource for the allocation to the wireless device 22.

In some embodiments, dynamically adjusting the allocation decision threshold includes determining, such as via allocation unit 24, processing circuitry 34, processor 36, communication interface 28 and/or radio interface 30, whether there is at least one radio resource that is available for the allocation to a wireless device 22; increasing, such as via allocation unit 24, processing circuitry 34, processor 36, communication interface 28 and/or radio interface 30, the allocation decision threshold by at least one step up parameter when there is at least one radio resource that is available for the allocation to the wireless device 22 and an estimated benefit to the wireless device 22 is greater than or equal to the allocation decision threshold; and decreasing, such as via allocation unit 24, processing circuitry 34, processor 36, communication interface 28 and/or radio interface 30, the allocation decision threshold by at least one step down parameter when there is an unavailability of at least one radio resource for the allocation to the wireless device 22.

In some embodiments, a size of at least one of the step up parameter and the step down parameter is based at least in part on a target allocation. In some embodiments, determining whether to allocate the at least one radio resource based at least in part on the allocation decision threshold includes estimating, such as via allocation unit 24, processing circuitry 34, processor 36, communication interface 28 and/or radio interface 30, a benefit of allocating the at least one radio resource to the wireless device; comparing, such as via allocation unit 24, processing circuitry 34, processor 36, communication interface 28 and/or radio interface 30, the estimated benefit to the allocation decision threshold; and one of allocating and not allocating the at least one radio resource to the wireless device 22 based at least in part on the comparison of the estimated benefit to the allocation decision threshold.

In some embodiments, estimating the benefit of allocating the at least one radio resource to the wireless device 22 further includes estimating, such as via allocation unit 24, processing circuitry 34, processor 36, communication interface 28 and/or radio interface 30, the benefit to the wireless device 22 based at least in part on at least one of: a total of data transmitted in a downlink channel to the wireless device 22; a total of time that the wireless device 22 has been active in a system of the network node 16; a downlink inactivity time; and using a machine learning algorithm. In some embodiments, the method further includes one of allocating and not allocating the at least one radio resource to the wireless device 22 based on the determination. In some embodiments, determining whether to allocate the at least one radio resource based at least in part on the allocation decision threshold includes using, such as via allocation unit 24, processing circuitry 34, processor 36, communication interface 28 and/or radio interface 30, the dynamically adjusted allocation decision threshold to control an output of a binary classification system, the binary classification system configured to determine whether to allocate the at least one radio resource to the wireless device 22. In some embodiments, the binary classification system may be implemented in the allocation unit 24.

Figure 4:
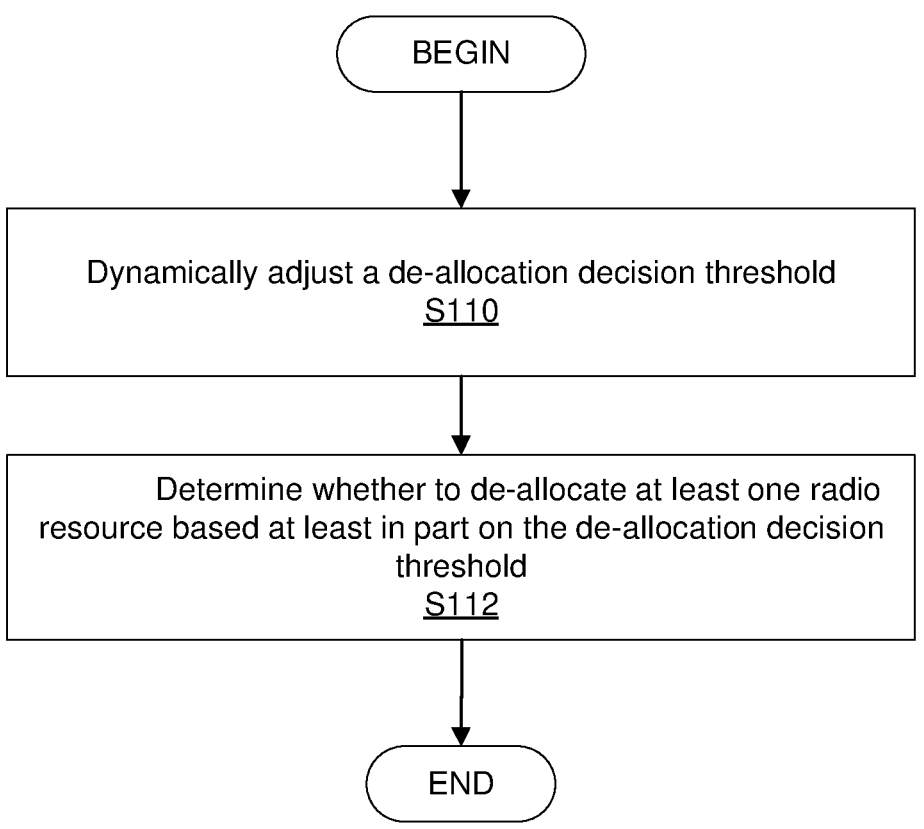
FIG. 4 is a flowchart of an example method for a network node for deallocating resources according to one embodiment of the present disclosure.

FIG. 4 is a flowchart of an exemplary process in a wireless device 22 for network node 16 for de-allocating resources using a dynamic decision threshold according to some embodiments of the present disclosure. One or more Blocks and/or functions and/or methods performed by WD 22 may be performed by one or more elements of WD 22 such as by de-allocation unit 26 in processing circuitry 46, processor 48, communication interface 28, radio interface 44, etc. The example method includes dynamically adjusting (Block S110), such as via de-allocation unit 26, processing circuitry 46, processor 48, communication interface 28, and/or radio interface 44, a de-allocation decision threshold. The method includes determining (Block S112), such as via de-allocation unit 26, processing circuitry 46, processor 48, communication interface 28, and/or radio interface 44, whether to de-allocate at least one radio resource based at least in part on the de-allocation decision threshold.

In some embodiments, determining whether to de-allocate the at least one radio resource further includes determining, such as via de-allocation unit 26, processing circuitry 46, processor 48, communication interface 28, and/or radio interface 44, whether to de-allocate the at least one radio resource for a sounding reference signal, SRS, based at least in part on the allocation decision threshold. In some embodiments, dynamically adjusting the de-allocation decision threshold includes dynamically adjusting, such as via de-allocation unit 26, processing circuitry 46, processor 48, communication interface 28, and/or radio interface 44, the de-allocation decision threshold to achieve a target de-allocation. In some embodiments, the target de-allocation includes a target probability that an event will occur. In some embodiments, the target de-allocation is based at least in part on at least one of: a target de-allocation error; a cost associated with de-allocating the at least one radio resource; and a number of radio resource control, RRC, reconfigurations associated with de-allocating the at least one radio resource.

In some embodiments, the target probability is a predetermined target probability associated with at least one of: a probability of de-allocating resources to a wireless device; and a probability of de-allocating resources to the wireless device 22 and a same wireless device 22 is subsequently allocated resources. In some embodiments, determining whether to de-allocate the at least one radio resource based at least in part on the de-allocation decision threshold includes estimating, such as via de-allocation unit 26, processing circuitry 46, processor 48, communication interface 28, and/or radio interface 44, a non-benefit of de-allocating the at least one radio resource to the wireless device 22; comparing, such as via de-allocation unit 26, processing circuitry 46, processor 48, communication interface 28, and/or radio interface 44, the estimated non-benefit to the de-allocation decision threshold; and one of de-allocating and not de-allocating, such as via de-allocation unit 26, processing circuitry 46, processor 48, communication interface 28, and/or radio interface 44, the at least one radio resource to the wireless device 22 based at least in part on the comparison of the estimated non-benefit to the de-allocation decision threshold.

In some embodiments, dynamically adjusting the de-allocation decision threshold further includes increasing, such as via de-allocation unit 26, processing circuitry 46, processor 48, communication interface 28, and/or radio interface 44, the de-allocation decision threshold by at least one step up parameter when the one of the de-allocating and not de-allocating is de-allocating; and decreasing, such as via de-allocation unit 26, processing circuitry 46, processor 48, communication interface 28, and/or radio interface 44, the de-allocation decision threshold by at least one step down parameter when the one of the de-allocating and not de-allocating is not deallocating.

In some embodiments, dynamically adjusting the de-allocation decision threshold further includes decreasing, such as via de-allocation unit 26, processing circuitry 46, processor 48, communication interface 28, and/or radio interface 44, the de-allocation decision threshold by at least one step down parameter when the one of the de-allocating and not de-allocating is de-allocating; and increasing, such as via de-allocation unit 26, processing circuitry 46, processor 48, communication interface 28, and/or radio interface 44, the de-allocation decision threshold by at least one step up parameter and at least one step down parameter when the one of the de-allocating and not de-allocating is not de-allocating and is further a re-allocation. In some embodiments, a size of at least one of the step up parameter and the step down parameter is based at least in part on a target de-allocation.

In some embodiments, estimating the non-benefit of de-allocating the at least one radio resource to the wireless device includes estimating, such as via de-allocation unit 26, processing circuitry 46, processor 48, communication interface 28, and/or radio interface 44, the non-benefit to the wireless device 22 based at least in part on at least one of: a total of data transmitted in a downlink channel to the wireless device 22; a total of time that the wireless device 22 has been active in a system of the network node 16; a downlink inactivity time; and using a machine learning algorithm. In some embodiments, the method further includes one of de-allocating and not deallocating, such as via de-allocation unit 26, processing circuitry 46, processor 48, communication interface 28, and/or radio interface 44, the at least one radio resource to the wireless device 22 based on the determination. In some embodiments, determining whether to de-allocate the at least one radio resource based at least in part on the de-allocation decision threshold includes using, such as via de-allocation unit 26, processing circuitry 46, processor 48, communication interface 28, and/or radio interface 44, the dynamically adjusted de-allocation decision threshold to control an output of a binary classification system, the binary classification system configured to determine whether to de-allocate the at least one radio resource to the wireless device 22. In some embodiments, the binary classification system may be implemented in the de-allocation unit 26.

Having described the general process flow of arrangements of the disclosure and having provided examples of hardware and software arrangements for implementing the processes and functions of the disclosure, the sections below provide details and examples of arrangements for dynamic machine learning decision threshold for resource allocation/de-allocation, which may be implemented by the network node 16 and/or wireless device 22.

Some embodiments provide one or more techniques for using one or more dynamic machine learning decision thresholds to allocate/de-allocate radio resources to one or more WDs 22.

Some embodiments provide for use of one or more dynamic thresholds that are used in deciding/determining whether the user device (e.g., WD 22) should be allocated or deallocated a resource, such as a radio resource. In particular, some embodiments may use one or more of at least two thresholds, called herein as, allocTh and deallocTh, such that:

a WD 22 without a resource will be allocated a resource if the WD's 22 estimated or predicted benefit at least meets (e.g., is greater-than or equal-to allocTh); and/or a WD 22 with a resource will be de-allocated the resource if the WD's 22 estimated or predicted non-benefit at least meets (e.g., is greater-than or equal-to deallocTh).

In some embodiments, a non-benefit may be estimated separately and/or independently from a benefit; or the non-benefit may, in some embodiments, be dependent on the benefit. For example, if a predicted benefit is a probability, p, ranging from 0 to 1, the non-benefit may be equal to 1−p. As another example, if a predicted benefit is a non-negative score, s, ranging from 0 to any positive number e.g., infinity, the non-benefit can be equal to −s.

In some embodiments, at least one of the thresholds, allocTh and/or deallocTh, is updated dynamically by network node 16 to achieve a predefined target probability of a particular event, called herein as allocTarget. In one embodiment, the event may be defined as the event that no resource is available at a time of resource allocation (e.g., when scheduling for a physical channel that may include a signal to be allocated a resource for that channel, such as a periodic SRS for a physical uplink channel).

In some embodiments, the event may be defined as the event that no resource is available at the time of resource allocation while the WD's 22 estimated benefit is greater-than or equal-to allocTh. In one embodiment, allocTh is dynamically adjusted such that the probability that no resource is available at the time of resource allocation, is less than a predefined target probability, allocTarget. In some embodiments, this can be achieved using a controller design in e.g., allocation unit 24, where allocTh is updated every time an allocation decision is made, which allocTh may be updated according to the following formula, for example:

$$allocTh := \begin{cases} allocTh + upStepAlloc, & \text{if no resource is available,} \\ allocTh - downStepAlloc, & \text{otherwise,} \end{cases}$$

where upStepAlloc and downStepAlloc may be chosen as follows e.g.:
upStepAlloc: this may be a configurable parameter or variable specifying the amount of increase in the decision threshold; and/or
downStepAlloc: this may be a parameter or variable specifying the amount of decrease in the decision threshold which may be given by, for example:

$$downStep = \frac{allocTarget}{1 - allocTarget} \times upStep.$$

In another embodiment, allocTh is dynamically adjusted by e.g., allocation unit 24, based at least in part on an estimated benefit to the WD 22. For example, allocTh may be dynamically adjusted such that the probability that no resource is available at the time of resource allocation, while the WD's 22 estimated benefit is greater-than or equal-to allocTh, is less than a predefined target probability, allocTarget. In some embodiments, this can be achieved similar to the above as follows, for example:

$$allocTh := \begin{cases} allocTh + upStepAlloc, & \text{if no resource is available and user benefit} \geq allocTh, \\ allocTh - downStepAlloc, & \text{otherwise,} \end{cases}$$

where upStepAlloc and downStepAlloc may be defined as described above.

In some embodiments, the controller design described herein may be applied to any number of allocation decisions, such as adjusting SRS resource allocation where a control method is used to adapt the decision threshold for binary classification according to the load. Generally, in some embodiments, allocTh is dynamically adjusted by increasing allocTh when there is no resource that is available (e.g., for an SRS allocation), in order to make the criteria for allocating the resource more restrictive so e.g., only WDs 22 with a predicted high benefit will be allocated resources in subsequent allocation decision occasions. Conversely, allocation unit 24 decreases the allocTh when there is at least one available resource (e.g., for SRS allocation) in order to make the criteria of allocating resources less restrictive, so that more WDs 22 can be allocated resources in subsequent allocation decision occasions.

It should be noted also that in some embodiments of the present disclosure, the network node 16 may adapt the decision threshold for a binary classification according to the load. Other controller designs may also be applicable using the techniques disclosed herein.

In some embodiments, deallocTh is dynamically adjusted e.g., by de-allocation unit 26, based at least in part on a predefined de-allocation target. For example, in some embodiments, deallocTh is dynamically adjusted such that the probability of de-allocating resources at least meets or does not exceed a predefined target, deallocTarget. In some embodiments, this can be achieved by updating deallocTh every time a de-allocation decision is made, such as according to the following equation, for example:

$$deallocTh := \begin{cases} deallocTh + upStepDealloc, & \text{if } deallocation \text{ is made,} \\ deallocTh - downStepDealloc, & \text{otherwise,} \end{cases}$$

where upStepDealloc and downStepDealloc are defined as follows, for example:
upStepDealloc: a configurable parameter or variable specifying the amount of increase in the decision threshold; and/or
downStepDealloc: the amount of decrease in the decision threshold given by, for example:

$$downStepDealloc = \frac{deallocTarget}{1 - deallocTarget} \times upStepDealloc.$$

In yet another embodiment, de-allocation unit 26 dynamically adjusts deallocTh based at least in part on a predefined de-allocation target. For example, deallocTh may be dynamically adjusted such that the probability of deallocating a resource for a WD 22 and then the same WD 22 is allocated a resource in the future (ping-pong effect), is less than a predefined target, deallocTarget. In some embodiments, this can be achieved by updating deallocTh every time a de-allocation decision or reallocation decision is made, such as, for example:
every time de-allocation decision is made: deallocTh:=deallocTh−downStepDealloc; and every time a reallocation for a WD 22 is made (i.e., the WD 22 was deallocated in the past and at a current time instance, the WD 22 is reallocated a resource): deallocTh:=deallocTh+upStepDealloc+downStepDealloc, where upStepDealloc and downStepDealloc are defined the same way as in the previous embodiment.

In yet another embodiment, deallocTh may be derived based on allocTh and the mapping between benefit and non-benefit, while adding a hysteresis to avoid pingpong effect. For example, if a predicted benefit is a non-negative score, s, ranging from 0 to any positive number e.g., infinity, and the non-benefit is −s, then deallocTh can be set to be equal to −allocTh+hysterisisTh, where hysterisisTh is non-negative configurable static parameter. As another example, if the predicted benefit is a probability, p, ranging from 0 to 1, and the non-benefit is equal to 1−p, then deallocTh can be set to be equal to (1−allocTh)+hysterisisTh, where hysterisisTh is non-negative configurable static parameter.

Generally, in some embodiments, deallocTh increases when de-allocation is made to make the criteria of deallocating resource more restrictive so only user devices with predicted high non-benefit will be deallocated resources in upcoming deallocations. Conversely, the deallocTh decreases when de-allocation is not made to make the criteria of deallocating resource less restrictive, so more user devices can be deallocated resources in upcoming deallocations.

In yet another embodiment, deallocTarget may be set to be lower than allocTarget to avoid a ping-pong effect.

In yet another embodiment, allocTh and/or deallocTh are bounded by preconfigured minimum and maximum values, i.e., after each update:

allocTh:=min(max(allocTh,minAllocTh),maxAllocTh);

deallocTh:=min(max(deallocTh,minDeallocTh), maxDeallocTh).

In yet another embodiment, deallocTarget is set to be lower than allocTarget.

In yet another embodiment, deallocTarget and allocTarget, are adjusted to control a cost of allocating and/or deallocating resources. In some embodiments, the cost can be e.g., a number of RRC reconfigurations for allocating and/or deallocating the resources. In general, some embodiments of the present disclosure may be applicable for any benefit and non-benefit estimators. In one example, the benefit estimator and non-benefit estimators are derived directly from observed features. For example, the benefit can be equal to a total data that was transmitted in the downlink for the WD 22, or the downlink inactivity time defined as the difference between the time the benefit is estimated, and the last time downlink data transmission occurred, the time the WD 22 was active, or the total time the WD 22 is in the system (e.g., total time WD 22 was in a cell provided by a gNB), or any other feature that may be used to measure a WD 22 benefit. In another example, the benefit estimator and/or non-benefit estimator can be based on machine learning algorithms that use any set of observed features as inputs to a machine learning model such as Logistic regression, random-forest, decision trees, neural networks, support vector machines, K-nearest-neighbors, long-short-term memory networks, etc. In some embodiments, the benefit estimator may be implemented in the allocation unit 24 or otherwise in the network node 16. In some embodiments, the non-benefit estimator may be implemented in the de-allocation unit 26 or otherwise in the network node 16.

Figure 5:
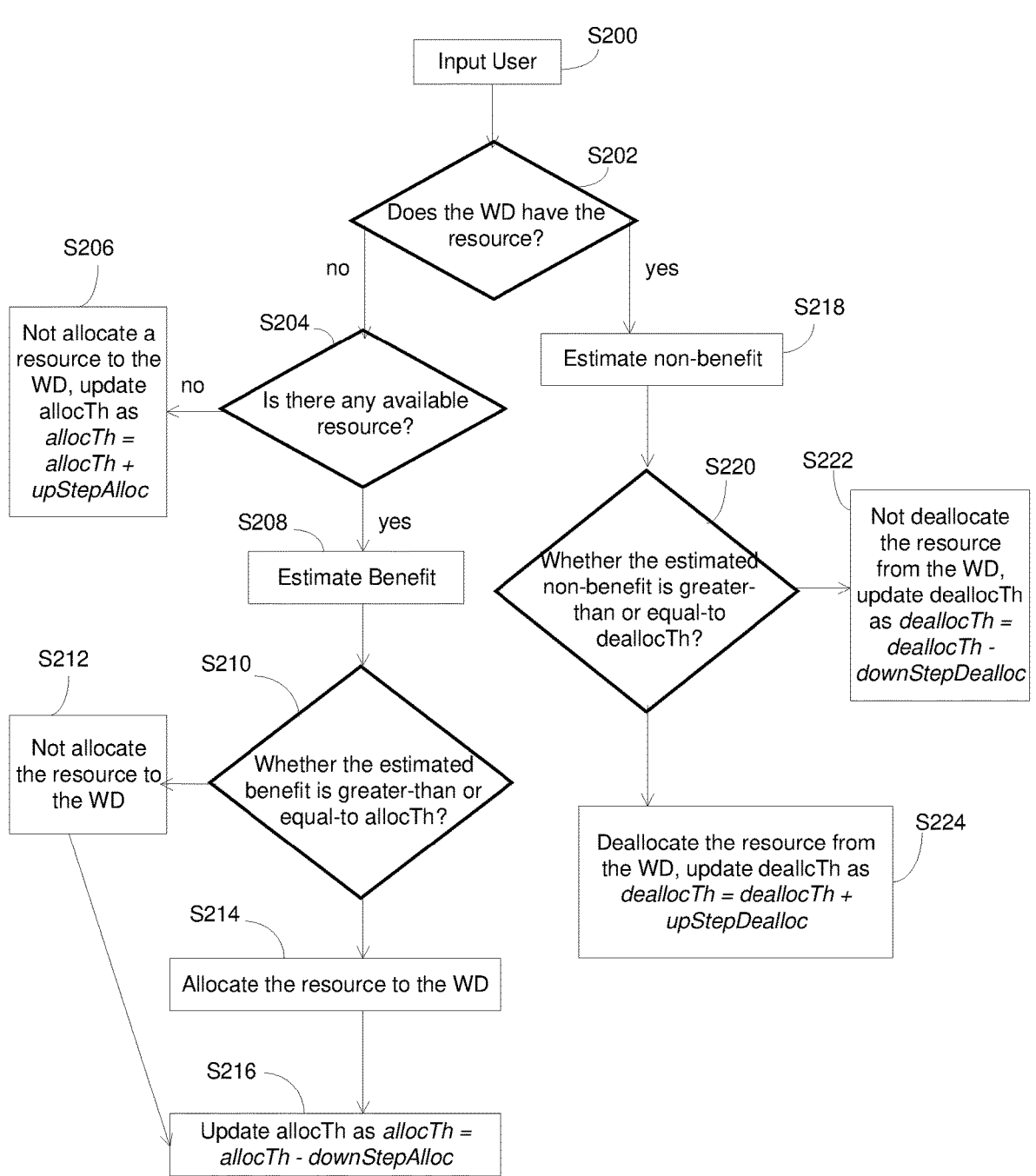
FIG. 5 is a flow chart illustrating an example method of dynamically adjusting a decision threshold for allocating and de-allocating resources according to one embodiment of the present disclosure.

One example process of resource allocation/de-allocation (which may be performed by network node 16, such as via e.g., allocation unit 24 and/or de-allocation unit 26) including dynamic decision thresholds is illustrated in the flowchart depicted in FIG. 5. For a given WD 22, as input in step S200 for example, the network node 16 may determine whether or not the WD 22 has a resource (e.g., whether the WD 22 is allocated a periodic SRS) in step S202.

If the user device has no resource, in step S204, network node 16 may determine whether there are any available resources. If there are no available resources, in step S206, the network node 16 will not allocate to the WD 22 any resource and the allocation decision threshold, allocTh, is adjusted, such as, increased by e.g., upStepAlloc. If there is an available resource, in step S208, network node 16 may estimate the benefit that the WD 22 may have by obtaining a resource. In step S210, network node 16 may compare the estimated benefit to the allocTh. For example, if the estimated benefit is lower than the allocTh, the WD 22 may not be allocated a resource in step S212; otherwise, the WD 22 may be allocated a resource in step S214. Since there is a resource available, in step S216, network node 16 may adjust the allocation decision threshold, allocTh, e.g., decreasing by downStepAlloc.

On the other, in step S202, if the WD 22 has a resource, the network node 16 may estimate the non-benefit that WD may have by keeping the resource in step S218. In step S220, network node 16 may compare the estimated non-benefit to the de-allocation decision threshold, deallocTh. For example, if the estimated non-benefit is lower than the deallocTh, the process may proceed to step S222 where the resource will not be deallocated from the WD and the deallocTh is adjusted, such as decreased by e.g., downStepDealloc. If the estimated non-benefit is greater than or equal-to the deallocTh, the process may proceed to step S224 where the resource will be deallocated from the WD 22 and the deallocTh is adjusted, such as increased by e.g., upStepDealloc.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node, the method comprising:

dynamically adjusting an allocation decision threshold; and determining whether to allocate at least one radio resource based at least in part on the allocation decision threshold, comprising:

estimating a benefit of allocating the at least one radio resource to a wireless device, wherein estimating the benefit to the wireless device is based at least in part on using a machine learning algorithm;

comparing the estimated benefit to the allocation decision threshold; and one of allocating and not allocating the at least one radio resource to the wireless device based at least in part on the comparison of the estimated benefit to the allocation decision threshold, wherein dynamically adjusting the allocation decision threshold comprises:

determining whether there is at least one radio resource that is available for the allocation to a wireless device;

increasing the allocation decision threshold by at least one step up parameter when there is at least one radio resource that is available for the allocation to the wireless device and the estimated benefit to the wireless device is greater than or equal to the allocation decision threshold; and decreasing the allocation decision threshold by at least one step down parameter when there is an unavailability of at least one radio resource for the allocation to the wireless device, wherein a size of at least one of the step up parameter and the step down parameter is based at least in part on a target allocation, wherein the size of the step down parameter is described according to a formula:

$$downStep = AllocTarget/1 - allocTarget \times upStep$$

where downStep is the step down parameter, upStep is the step up parameter, and allocTarget is the target allocation.

2. The method of claim 1, wherein determining whether to allocate the at least one radio resource further comprises:

determining whether to allocate the at least one radio resource for a sounding reference signal, SRS, based at least in part on the allocation decision threshold.

3. The method of claim 1, wherein dynamically adjusting the allocation decision threshold comprises:

dynamically adjusting the allocation decision threshold to achieve the target allocation.

4. The method of claim 1, wherein the target allocation comprises a target probability that an event will occur.

5. The method of claim 4, wherein the target allocation is based at least in part on:

a target allocation error.

6. The method of claim 4, wherein the target probability is a predetermined target probability that the event will occur, the event being one of:

that a radio resource is unavailable for allocation to a wireless device; and that the radio resource is unavailable for allocation to the wireless device while the estimated benefit to the wireless device is greater than or equal to the allocation decision threshold.

7. The method of claim 1, wherein estimating the benefit to the wireless device is further based at least in part on a total of data transmitted in a downlink channel to the wireless device.

8. A method implemented in a network node, the method comprising:

dynamically adjusting a de-allocation decision threshold; and determining whether to de-allocate at least one radio resource based at least in part on the de-allocation decision threshold, comprising:

estimating a non-benefit of de-allocating the at least one radio resource to a wireless device, wherein estimating the non-benefit to the wireless device is based at least in part on using a machine learning algorithm;

comparing the estimated non-benefit to the de-allocation decision threshold; and one of de-allocating and not de-allocating the at least one radio resource to the wireless device based at least in part on the comparison of the estimated non-benefit to the de-allocation decision threshold, wherein dynamically adjusting the de-allocation decision threshold further comprises:

increasing the de-allocation decision threshold by at least one step up parameter when the one of the de-allocating and not de-allocating is de-allocating; and decreasing the de-allocation decision threshold by at least one step down parameter when the one of the de-allocating and not de-allocating is not de-allocating, wherein a size of at least one of the step up parameter and the step down parameter is based at least in part on a target de-allocation, wherein the size of the step down parameter is described according to a formula:

$$downStepDealloc = deallocTarget/1 - deallocTarget \times upStepDealloc$$

where downStepDealloc is the step down parameter, upStepDealloc is the step up parameter, and deallocTarget is the target de-allocation.

9. The method of claim 8, wherein determining whether to deallocate the at least one radio resource further comprises:

determining whether to de-allocate the at least one radio resource for a sounding reference signal, SRS, based at least in part on the de-allocation decision threshold.

10. The method of claim 8, wherein dynamically adjusting the de-allocation decision threshold comprises:

dynamically adjusting the de-allocation decision threshold to achieve the target de-allocation.

11. The method of claim 8, wherein the target de-allocation comprises a target probability that an event will occur.

12. The method of claim 11, wherein the target de-allocation is based at least in part on:

a target de-allocation error.

13. The method of claim 11, wherein the target probability is a predetermined target probability associated with at least one of:

a probability of de-allocating resources to a wireless device; and a probability of de-allocating resources to the wireless device and a same wireless device is subsequently allocated resources.

14. The method of claim 8, wherein dynamically adjusting the de-allocation decision threshold further comprises:

decreasing the de-allocation decision threshold by at least one step down parameter when the one of the de-allocating and not de-allocating is de-allocating; and increasing the de-allocation decision threshold by at least one step up parameter and at least one step down parameter when the one of the de-allocating and not de-allocating is not deallocating and is further a re-allocation.

15. The method of claim 8, wherein estimating the non-benefit to the wireless device is further based at least in part on a total of data transmitted in a downlink channel to the wireless device.

16. A network node comprising processing circuitry, the processing circuitry configured to cause the network node to:

dynamically adjust an allocation decision threshold; and determine whether to allocate at least one radio resource based at least in part on the allocation decision threshold, comprising:

estimating a benefit of allocating the at least one radio resource to a wireless device, wherein estimating the benefit to the wireless device is based at least in part on using a machine learning algorithm;

comparing the estimated benefit to the allocation decision threshold; and one of allocating and not allocating the at least one radio resource to the wireless device based at least in part on the comparison of the estimated benefit to the allocation decision threshold, wherein dynamically adjusting the allocation decision threshold comprises:

determining whether there is at least one radio resource that is available for the allocation to a wireless device;

increasing the allocation decision threshold by at least one step up parameter when there is at least one radio resource that is available for the allocation to the wireless device and the estimated benefit to the wireless device is greater than or equal to the allocation decision threshold; and decreasing the allocation decision threshold by at least one step down parameter when there is an unavailability of at least one radio resource for the allocation to the wireless device, wherein a size of at least one of the step up parameter and the step down parameter is based at least in part on a target allocation, wherein the size of the step down parameter is described according to a formula:

$$downStep = allocTarget/1 - allocTarget \times upStep$$

where downStep is the step down parameter, upStep is the step up parameter, and allocTarget is the target allocation.

17. A network node comprising processing circuitry, the processing circuitry configured to cause the network node to:

dynamically adjust a de-allocation decision threshold; and determine whether to de-allocate at least one radio resource based at least in part on the de-allocation decision threshold, comprising:

estimating a non-benefit of de-allocating the at least one radio resource to a wireless device, wherein estimating the non-benefit to the wireless device is based at least in part on using a machine learning algorithm;

comparing the estimated non-benefit to the de-allocation decision threshold; and one of de-allocating and not de-allocating the at least one radio resource to the wireless device based at least in part on the comparison of the estimated non-benefit to the de-allocation decision threshold, wherein dynamically adjusting the de-allocation decision threshold further comprises:

increasing the de-allocation decision threshold by at least one step up parameter when the one of the de-allocating and not de-allocating is de-allocating; and decreasing the de-allocation decision threshold by at least one step down parameter when the one of the de-allocating and not de-allocating is not de-allocating, wherein a size of at least one of the step up parameter and the step down parameter is based at least in part on a target de-allocation, wherein the size of the step down parameter is described according to a formula:

$$downStepDealloc = deallocTarget/1 - deallocTarget \times upStepDealloc$$

where downStepDealloc is the step down parameter, upStepDealloc is the step up parameter, and deallocTarget is the target de-allocation.

18. The method of claim 1, wherein estimating the benefit to the wireless device is further based at least in part on a total of time that the wireless device has been active in a system of the network node.

19. The method of claim 1, wherein estimating the benefit to the wireless device is further based at least in part on a downlink inactivity time.

20. The method of claim 8, wherein estimating the non-benefit to the wireless device is further based at least in part on a total of time that the wireless device has been active in a system of the network node.

21. The method of claim 8, wherein estimating the non-benefit to the wireless device is further based at least in part on a downlink inactivity time.

22. The method of claim 14, wherein the de-allocation decision threshold is derived by adding a hysteresis parameter to a negative value of an allocation decision threshold.

23. The method of claim 8, wherein the de-allocation decision threshold is derived by adding a hysteresis parameter to a result of one minus an allocation decision threshold.

24. The method of claim 4, wherein the target allocation is based at least in part on a cost associated with allocating the at least one radio resource.

25. The method of claim 4, wherein the target allocation is based at least in part on a number of radio resource control, RRC, reconfigurations associated with allocating the at least one radio resource.

26. The method of claim 11, wherein the target de-allocation is based at least in part on a cost associated with de-allocating the at least one radio resource.

27. The method of claim 11, wherein the target de-allocation is based at least in part on a number of radio resource control, RRC, reconfigurations associated with de-allocating the at least one radio resource.

* * * * *